United States Patent
Sekiya et al.

(10) Patent No.: US 9,037,362 B2
(45) Date of Patent: May 19, 2015

(54) SHIFT RANGE SWITCHING APPARATUS OF AUTOMATIC TRANSMISSION

(75) Inventors: Keisuke Sekiya, Toyota (JP); Koki Ueno, Toyota (JP); Mitsuaki Ishimaru, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 56 days.

(21) Appl. No.: 13/639,218

(22) PCT Filed: Apr. 15, 2010

(86) PCT No.: PCT/JP2010/002728
§ 371 (c)(1),
(2), (4) Date: Oct. 4, 2012

(87) PCT Pub. No.: WO2011/128938
PCT Pub. Date: Oct. 20, 2011

(65) Prior Publication Data
US 2013/0024079 A1    Jan. 24, 2013

(51) Int. Cl.
*G06F 7/00* (2006.01)
*G06F 17/00* (2006.01)
*G06F 19/00* (2011.01)
*F16H 61/32* (2006.01)
*F16H 61/28* (2006.01)

(52) U.S. Cl.
CPC .......... *F16H 61/32* (2013.01); *F16H 2061/283* (2013.01); *F16H 2061/326* (2013.01)

(58) Field of Classification Search
CPC ..................... F16H 2061/283; F16H 2061/326
USPC .............................................. 701/51
See application file for complete search history.

(56) References Cited

U.S. PATENT DOCUMENTS

| | | | |
|---|---|---|---|
| 7,040,187 B2 | 5/2006 | Amamiya et al. | |
| 7,442,147 B2 | 10/2008 | Matsuzaki et al. | |
| 7,828,695 B2 | 11/2010 | Inoue et al. | |
| 2002/0019287 A1 | 2/2002 | Ebashi et al. | |
| 2004/0200301 A1 | 10/2004 | Amamiya et al. | |
| 2006/0138880 A1 | 6/2006 | Kimura et al. | |
| 2006/0207373 A1* | 9/2006 | Amamiya et al. | 74/473.36 |
| 2008/0103665 A1 | 5/2008 | Kubonoya et al. | |
| 2008/0168853 A1 | 7/2008 | Amamiya et al. | |
| 2008/0210033 A1 | 9/2008 | Amamiya et al. | |
| 2009/0039822 A1 | 2/2009 | Kimura et al. | |

FOREIGN PATENT DOCUMENTS

| | | |
|---|---|---|
| DE | 10 2004 017 257 | 12/2004 |
| DE | 10 2006 029 813 | 1/2007 |

(Continued)

*Primary Examiner* — Yonel Beaulieu
*Assistant Examiner* — Lail Kleinman
(74) *Attorney, Agent, or Firm* — Finnegan, Henderson, Farabow, Garrett & Dunner, LLP

(57) ABSTRACT

Disclosed is a shift range switching apparatus of an automatic transmission which can improve the durability over the conventional shift range switching apparatus. An ECU is operative to rotate an actuator in a predetermined direction (Step S2) in the state of the automatic transmission switched to a predetermined shift range (Step S1), and thereafter the actuator is deenergized (Step S3). The reference position of the actuator corresponding to the predetermined shift range is detected (Step S5) in accordance with the fluctuation of the count value counted by an encoder when the actuator is deenergized (Step S4).

4 Claims, 10 Drawing Sheets

(56) References Cited

FOREIGN PATENT DOCUMENTS

| | | |
|---|---|---|
| DE | 10 2007 053 768 | 6/2008 |
| JP | 7-305770 | 11/1995 |
| JP | 2002-48230 | 2/2002 |
| JP | 2004-308752 | 11/2004 |
| JP | 2004-308846 | 11/2004 |
| JP | 2004-308848 | 11/2004 |
| JP | 2005-69295 | 3/2005 |
| JP | 2005-90575 | 4/2005 |
| JP | 2006-191709 | 7/2006 |
| JP | 2008-106921 | 5/2008 |
| JP | 2009-115219 | 5/2009 |

* cited by examiner

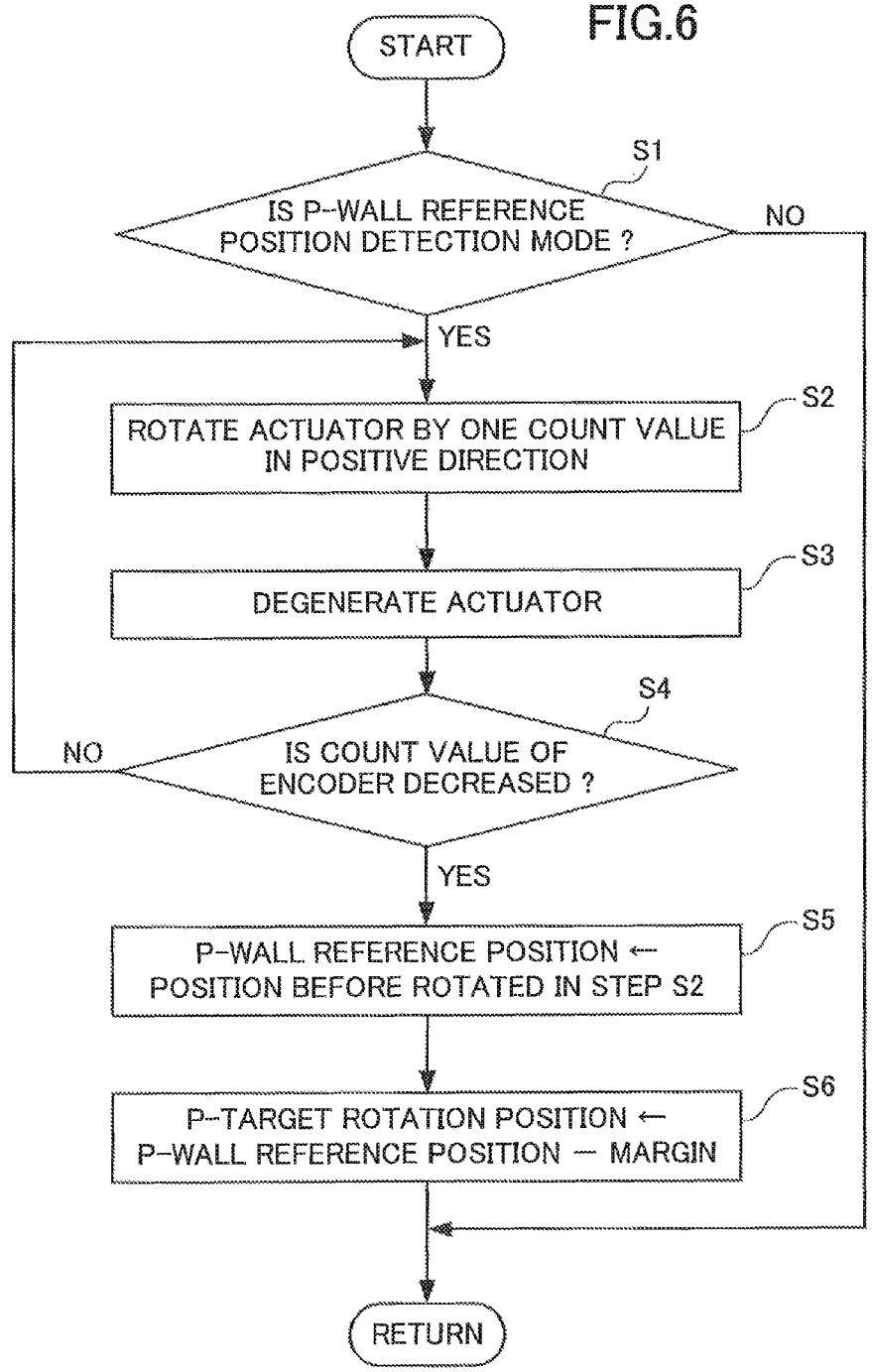

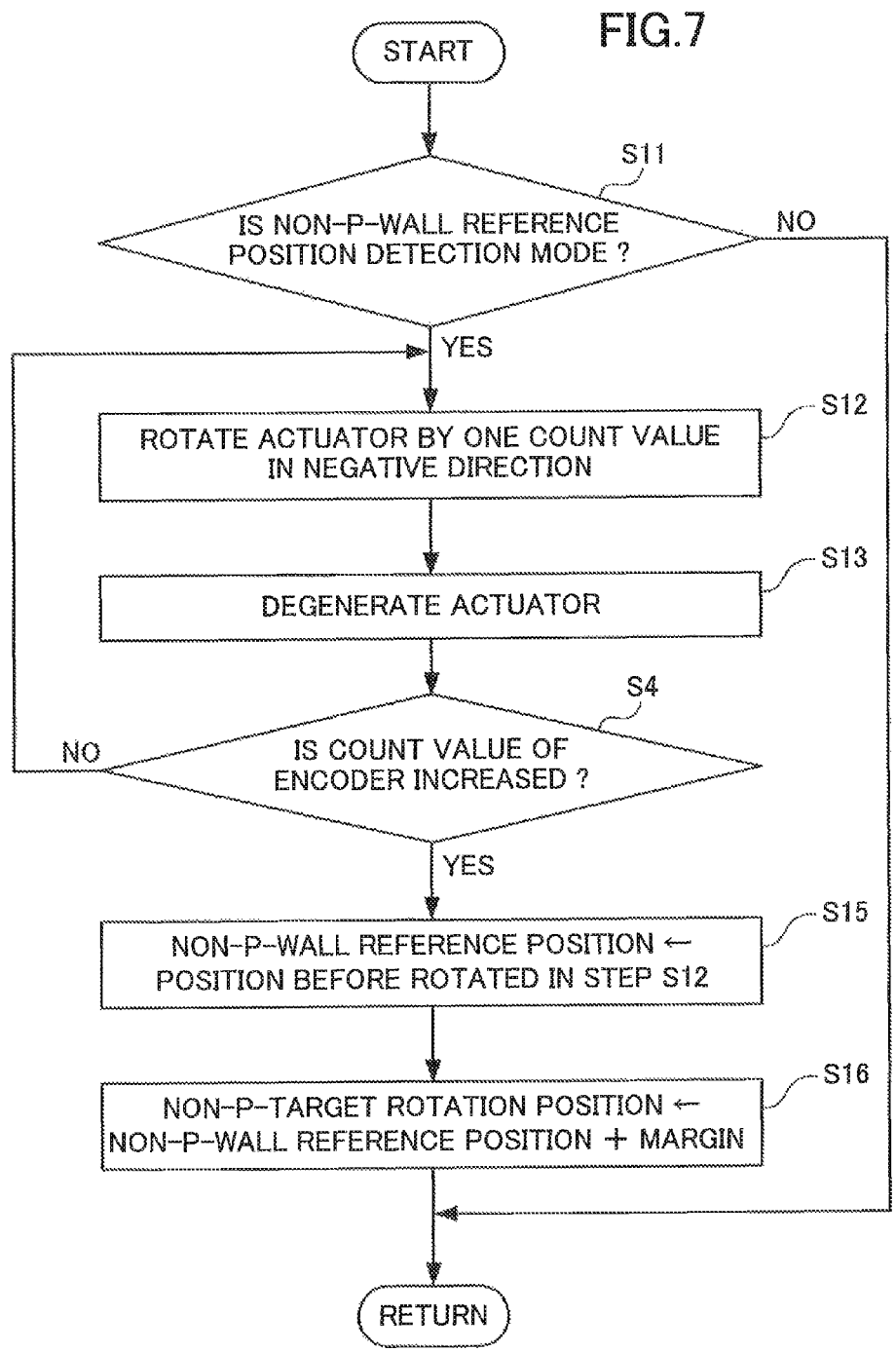

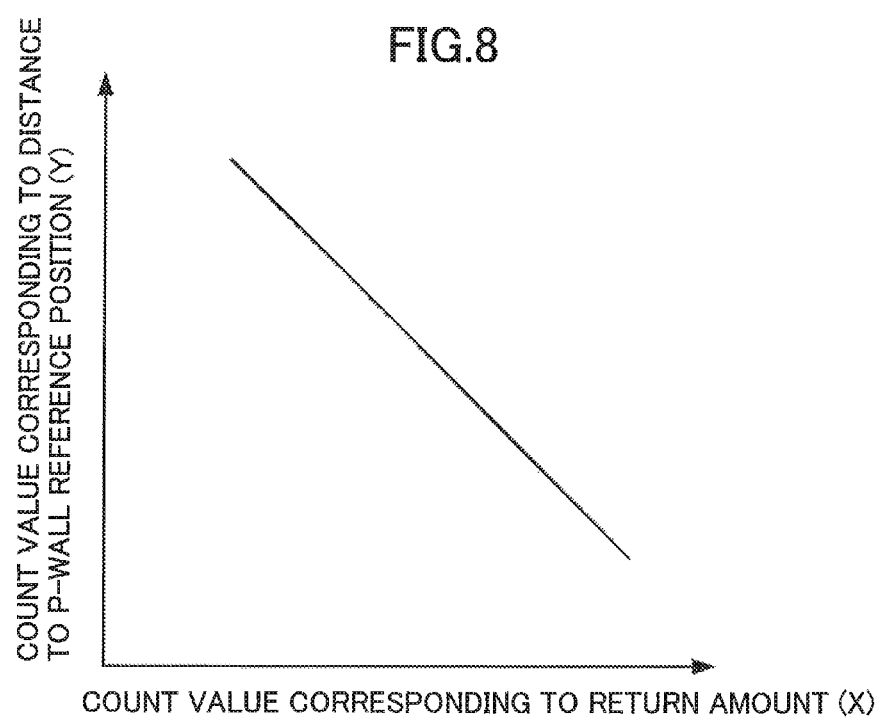

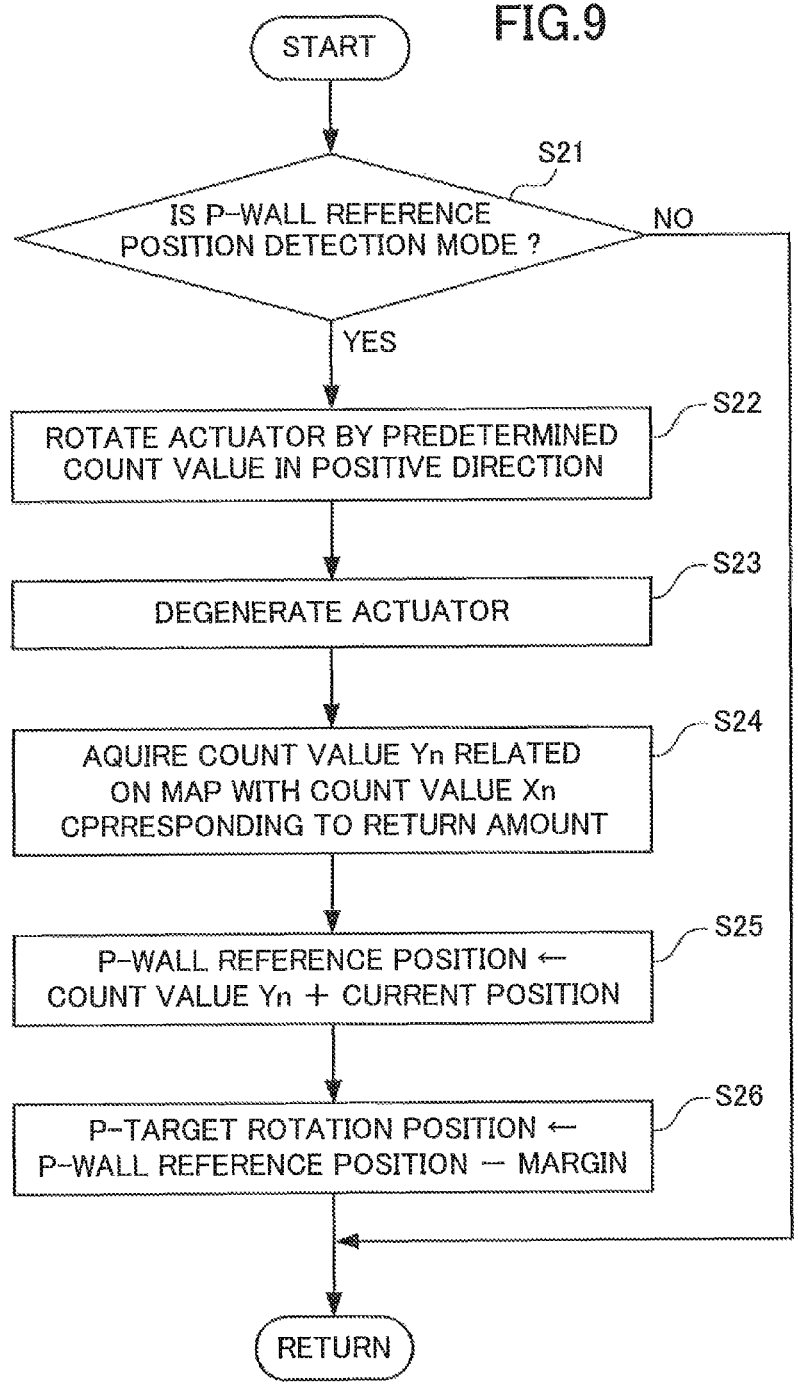

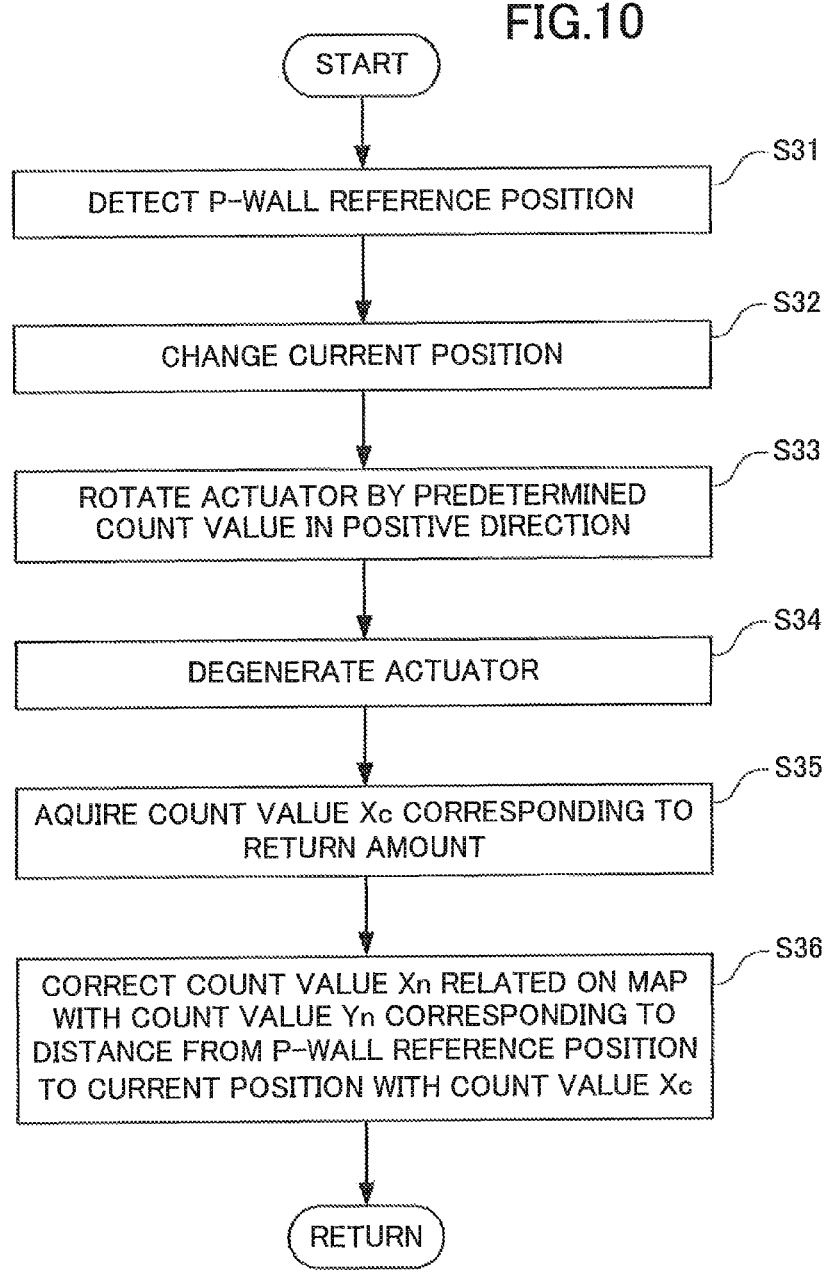

SHIFT RANGE SWITCHING APPARATUS OF AUTOMATIC TRANSMISSION

CROSS-REFERENCE TO RELATED APPLICATIONS

This application is a national phase application of International Application No. PCT/JP2010/002728, filed Apr. 15, 2010, the content of which is incorporated herein by reference.

TECHNICAL FIELD

The present invention relates to a shift range switching apparatus of an automatic transmission.

BACKGROUND ART

In recent years, there have been proposed a wide variety of shift range switching apparatuses which are used in a conventional automatic transmission. A representative one of the known shift range switching apparatuses is called a shift-by-wire type different from a directly operated type in driving a detent lever, and comprising a sensor, or a switch for detecting the operation of a shift lever by a driver to output shift range signals indicative of the operations of the shill lever, and an actuator operated in response to the shift range signals (for example see Patent Document 1).

The shift range switching apparatus of the automatic transmission disclosed in the Patent Document 1 is provided with a shift control mechanism which comprises a shaft rotated by the actuator, a detent plate rotated in response to the rotation of the shaft, a parking rod operated in response to the rotation of the detent lever, a parking gear secured to an output shaft of the automatic transmission, a parking lock pawl for locking the parking gear, and a detent spring for restricting the rotation of the detent lever to secure the shaft range.

The shift control mechanism disclosed in the Patent Document 1 comprises a detent lever having an outer peripheral portion formed with valleys corresponding to a parking state and a parking release state, respectively, and a detent spring having a roller supported thereon. The roller is moved along the outer peripheral surface of the detent lever in response to the rotation of the detent lever caused by the rotation of the actuator to take either one of the respective positions in the valleys, so that the shift control mechanism can be switched to either one of the parking state and the parking release state. This construction leads to the fact that the shift range switching apparatus of the automatic transmission disclosed in the Patent Document 1 can be switched into at least the parking range and the shift ranges other than the parking range.

Here, the shift range switching apparatus disclosed in the Patent Document 1 is adapted to set a target rotation position immediately before the roller collides with a wall forming either one of the valleys, and to control the rotation of the actuator to have the roller stopped at the target rotation position, thereby lessening the load on the shift control mechanism.

The target rotation position is a target position acquired by the rotation of the actuator at the shift range switching time, and thus is defined with a margin in consideration of backlashes from the actuator to the detent lever with respect to a reference position where the roller is in engagement with the wall. This means that the reference position not accurately detected makes it impossible to adequately define the target position. The reference position not accurately detected results in the heavy load on the shift control mechanism with the rotation action of the actuator, thereby leading to lowering the durability of the shift control mechanism.

For this reason, the shift range switching apparatus of the automatic transmission disclosed in the Patent Document 1 is adapted to accurately detect the reference position, and thus comprises a roller pressingly engaged with a wall formed on the detent lever until the rotation force of the actuator, the restoring force of the detent spring, and the restoring force of the rod are balanced. The reference position of the actuator is detected in accordance with the relationships of the applied voltage of the actuator, and the amounts of deflection or elongation of the detent lever.

CITATION LIST

Patent Literature

{Patent Document 1 }
Japanese Patent Application Publication No. 2005-090575

SUMMARY OF INVENTION

Technical Problem

However, the conventional shift range switching apparatus thus constructed encounters such a problem that there is caused a heavy load on the shift control mechanism, thereby leading to the lowering of the durability to the shift control mechanism due to the reason that the roller is pressingly engaged with the wall formed on the detent lever until the rotation force of the actuator, the restoring force of the detent spring, and the restoring force of the rod are balanced for the purpose of detecting the reference position of the actuator.

It is therefore an object of the present invention to provide a shift range switching apparatus of an automatic transmission which can improve the durability of the conventional shift control mechanism.

Solution to Problem

The shift range switching apparatus of the automatic transmission according to the present invention for shifting shift ranges with an actuator, comprising a counter unit that counts the number corresponding to the rotation amount of the actuator, a rotation control unit that controls the rotation of the actuator, a regulation unit that regulates the actuator from being rotated in a predetermined rotation direction in a predetermined shift range, and a reference position detection unit that detects a reference position of the actuator to be regulated by the regulation unit, the rotation control unit being operative to have the actuator deenergized after the actuator is rotated in a predetermined direction in the state that the automatic transmission is shifted to a predetermined shift range, and the reference position detection unit being operative to detect the reference position in accordance with the fluctuation of the count value counted by the counter unit when the actuator is deenergized.

The shift range switching apparatus thus constructed can allow the actuator to be not required to be rotated for detecting the reference position until the rotation force of the actuator and the restoring force of the deflected or elongated detent spring are balanced as the conventional shift range switching apparatus, thereby making it possible to improve the durability of the shift control mechanism constituting the regulation unit including the detent spring over the conventional shift range switching apparatus.

In the shift range switching apparatus of the automatic transmission, the rotation control unit is preferably operative to have the actuator deenergized every time the actuator is rotated by one count value in the predetermined direction in the state that the automatic transmission is shifted to the predetermined shift range, and the reference position detection unit is preferably operative to detect the reference position in accordance with a prior count value counted by the counter unit before the actuator is rotated in the predetermined direction when fluctuation direction of the count value in which the actuator is rotated in the predetermined direction is opposite to the fluctuation direction of the count value in which the actuator is deenergized.

The shift range switching apparatus thus constructed can suppress the load on the regulation unit to a level corresponding to the one count value for detecting the reference position, thereby making it possible to improve the durability of the shift control mechanism constituting the regulation unit over the conventional shift range switching apparatus.

The shift range switching apparatus of the automatic transmission preferably further comprises a map storage unit that stores a map representative of the relationship between a first count value and a second count value, the first count value being corresponding to the return amount of the actuator caused when the actuator is deenergized after the actuator is rotated in the predetermined direction from the current position of the actuator by a predetermined count value, and the second count value being corresponding to the distance from the reference position to the current position of the actuator. The rotation control unit is preferably operative to have the actuator deenergized after the actuator is rotated by the predetermined count value in the predetermined direction from the current position of the actuator in the state that the automatic transmission is shifted to the predetermined shift range, and the reference position detection unit is preferably operative to detect the reference position in accordance with the second count value and the current position, the second count value being related on the map with the first count value corresponding to the return amount of the actuator caused when the actuator is deenergized.

The shift range switching apparatus thus constructed can detect the reference position only by rotating the actuator by only one time in the range of no rotation of the actuator until the rotation force of the actuator and the restoring force of the deflected or elongated detent spring are balanced, thereby making it possible to promptly detect the reference position.

The shift range switching apparatus of the automatic transmission preferably further comprises a map correction unit that corrects the map. The rotation control unit is operative to have the actuator deenergized every time the actuator is rotated by one count value in the predetermined direction in the state that the automatic transmission is shifted to the predetermined shift range. The reference position detection unit is operative to detect the reference position in accordance with a prior count value counted by the counter unit before the actuator is rotated in the predetermined direction when the fluctuation direction of the count value in which the actuator is rotated in the predetermined direction is opposite to the fluctuation direction of the count value in which the actuator is deenergized. The rotation control unit is further operative to have the actuator deenergized by rotating the actuator by the predetermined count value in the predetermined direction from an arbitrary position of the actuator when the reference position is detected. The map correction unit is operative to correct the map in accordance with the first count value corresponding to the return amount of the actuator caused when the actuator is deenergized and the second count value corresponding to the distance from the reference position to the arbitrary position.

The shift range switching apparatus thus constructed can optimize the map in response to the variations in quality and assembled state of the elements or parts forming the regulation unit and in response to secular changes of the elements or parts forming the regulation unit.

The map correction unit may preferably be operative to have the map corrected while the actuator is waiting.

The shift range switching apparatus thus constructed can promptly detect the reference position due to the establishment of the map when the reference position is detected.

Advantageous Effects of Invention

The present invention can provide a shift range switching apparatus of an automatic transmission which can improve the durability of a shift control mechanism to a level higher than that of the conventional shift control mechanism.

BRIEF DESCRIPTION OF DRAWINGS

FIG. 6 is a flow chart for explaining a P-wall reference position detection operation by the shift range switching apparatus according to the first embodiment of the present invention.

FIG. 7 is a flow chart for explaining a non-P-wall reference position detection operation by the shift range switching apparatus according to the first embodiment of the present invention.

FIG. 8 is a conceptual diagram showing a map to be referred by the shift range switching apparatus according to a second embodiment of the present invention.

FIG. 9 is a flow chart for explaining a P-wall reference position detection operation by the shift range switching apparatus according to the second embodiment of the present invention.

FIG. 10 is a flow chart for explaining a map correction operation for correcting a map to be used for detecting the P-wall reference position by the shift range switching apparatus according to the second embodiment of the present invention.

DESCRIPTION OF EMBODIMENTS

The embodiments of the present invention will be explained hereinafter with reference to the accompanying drawings.

(First Embodiment)

The power train of a vehicle having the shift range switching apparatus according to the present invention applied thereto will be described hereinafter with reference to FIG. 1.

Figure 1:
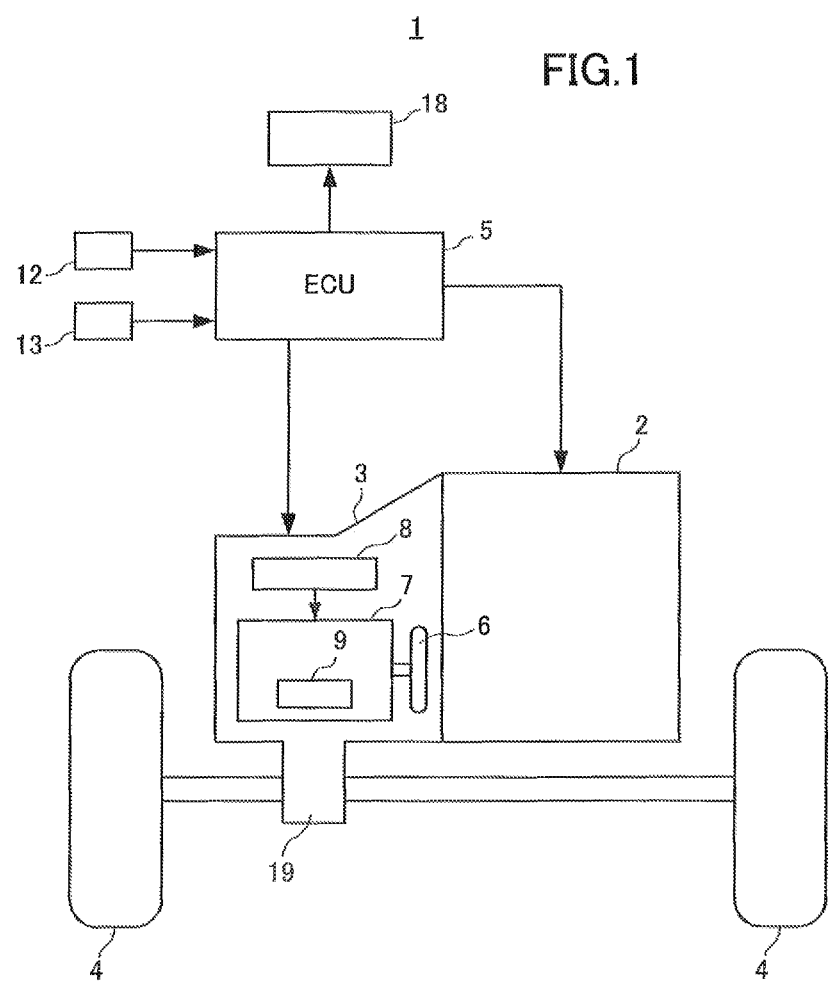
FIG. 1 is a constitutional view of a power train according to a first embodiment of the present invention.

FIG 1 shows a front engine-front drive type of power train. The vehicle 1 is provided with an engine 2 serving as a drive source, an automatic transmission 3, and drive wheels 4.

The engine 2 is constituted by a gasoline engine, a diesel engine, and the like. The operation of the engine 2 is controlled by an ECU (Electronic Control Unit) 5 which will become apparent as the description proceeds.

The automatic transmission 3 is mainly constituted to include a torque convertor 6, a transmission mechanism unit 7, and a hydraulic pressure control unit 8, and the transmission operation is controlled by the ECU 5.

The transmission mechanism unit 7 of the automatic transmission 3 is mainly constituted to include a plurality of planetary mechanisms, a plurality of friction engagement elements including clutches and brakes, and a one-way clutch, so that the friction engagement elements are selectively engaged or disengaged in accordance with an operation table preliminarily defined by the ECU 5 to establish variable speed stages requested by a driver.

The hydraulic pressure control unit has a hydraulic circuit provided with a plurality of manual valves operative to secure hydraulic paths to the previously mentioned friction engagement elements to selectively take, for example, a reverse position R (reverse travel), a neutral position N, or a drive position D (forward travel). More specifically, the hydraulic pressure control unit 8 is operative to have a drive mechanism not shown driven in response to shift range switching request signals outputted from the ECU 5 to drive the manual valves and to form the hydraulic paths corresponding to the respective shift ranges. In this way, the hydraulic pressure control unit 8 is adapted to electrically be controlled in response to the shift range switching request signals outputted from the ECU 5.

Although the present embodiment has been explained to have the hydraulic pressure control unit 8 provided with the manual valves, the manual valves are not necessarily provided, but the hydraulic pressure control unit 8 may have a hydraulic circuit provided with solenoid valves operative to be controlled by the ECU 5 in response to the shift range switching request signals outputted from the ECU 5, so that hydraulic paths to the previously mentioned friction engagement elements can be secured to take any one of the shift range positions.

The drive wheels 4 are transmitted with and driven by a forward driving force and a reverse driving force through a differential gear 19 disposed in the automatic transmission 3 and axle shafts laterally extending from the differential gear 19.

The transmission mechanism unit 7 of the automatic transmission 3 is provided with a shift control device 9 operative to control the shift range to selectively take a parking range position or one of shift range positions other than a parking range position to be established in response to the operation of a shift lever which will hereinafter be described. The shift control device 9 is adapted to electrically be controlled by the ECU 5 in response to the shift range switching request signals outputted from the ECU 5.

The vehicle 1 has a lever position sensor 12 and a vehicle electric source switch 13 serving as an input unit to input a detection signal to the ECU 5. The vehicle 1 further has a display unit 18 serving as an output unit to output information in accordance with the signal outputted from the ECU 5.

Next, explanation will be made about the shift range switching apparatus according to the present embodiment with reference to FIG. 2.

The shift range switching apparatus 10 according to the present embodiment is, as shown in FIG, 2, constituted to include a shift lever 11, a lever position sensor 12, a vehicle electric source switch 13, an ECU (Electric Control Unit) 5, a shift control device 9, a display unit 18, and the hydraulic pressure control unit 8.

The shift range switching apparatus 10 is constructed of a shift-by-wire type which can electrically switch the shift range in response to the operation of the shift lever 11. More specifically, the shift range can be switched in response to the shift position by the shift control device 9 and the hydraulic pressure control unit 8 which are controlled by the ECU 5.

The shift lever 11 is constructed to select one shift range selected from among a parking range (hereinafter simply referred to as "P-range"), a drive range (hereinafter simply referred to as "D-range"), a reverse range (hereinafter simply referred to as "R-range"), and a neutral range (hereinafter simply referred to as "N-range"). More specifically, the shift lever 11 is adapted to be guided by a guide member to the positions corresponding to the shift positions, respectively, and is constructed to retain the attitudes of the shift lever 11 retained by the guide member at the respective shift positions. Here, the shift ranges of the D-range, R-range, and N-range other than the P-range are hereinafter simply referred to as "non-P-range".

Figure 2:
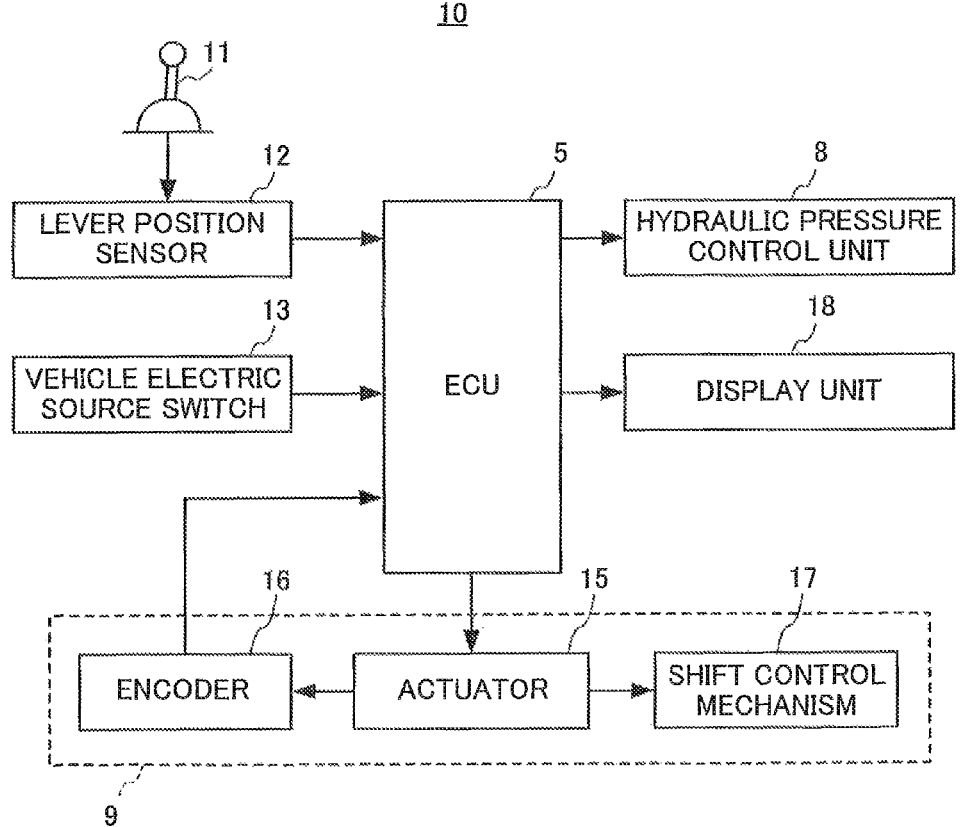
FIG. 2 is a functional block diagram showing the constitution of a shift range switching apparatus according to the first embodiment of the present invention.

The lever position sensor 12 appears to be constituted by only one sensor in FIG. 2, but in reality constituted by a plurality of sensors respectively positioned at the positions corresponding to the shift positions. For this reason, the ECU 5 is adapted to acquire the detection signals from the respective shift position sensors, thereby making it possible to detect the shift positions of the shift lever 11 operated by the driver. The shift range switching apparatus 10 may be provided with a P-switch and shift switches in lieu of the shift lever 11 and the lever position sensor 12 according to the present invention., Only the P-range of the shift range switching apparatus 10 may be detected by a push button type switch according to the present invention. In this construction, the shift positions other than the P-range are adapted to be detected by the lever position sensors 12 when the shift lever 11 is operated.

The vehicle electric source switch 13 is adapted to switch the ON/OFF of a vehicle electric source. The vehicle electric source switch 13 is constituted for example by an ignition switch. The shift range switching apparatus 10 is energized with the "ON" operation of the vehicle electric source switch 13, thereby supplying the electric power of a battery to the elements and parts forming the vehicle 1 to activate the those elements and parts.

The ECU 5 is constituted by a microcomputer provided with a CPU (Central Processing Unit), a RAM (Random Access Memory), a ROM (Read Only Memory), an EEPROM (Electrically Erasable and Programmable Read Only Memory), and an input/output interface, The CPU is adapted to be operated in compliance with the programs preliminarily stored in the ROM while taking advantage of the temporary storage function of the RAM, thereby performing the overall control of the elements and parts forming the shift range switching apparatus 10.

Although the above explanation of the present embodiment has been made about the vehicle 1 having only one ECU 5 for the sake of convenience of explanation, the present invention is not limited to one ECU but may include a plurality of ECUs which are adapted to control the vehicle 1. In this construction, the vehicle 1 may be provided with for example an. engine ECU for controlling the engine, an ECT (Electronic Controlled Automatic Transmission)-ECU for controlling the automatic transmission, and a SEW (Shift-By-Wire)-ECU for controlling the shift control device, those of which are adapted to exchange therebetween the information acquired from various sensors.

The ECU 5 is operative to perform the control to switch the shift range of the automatic transmission 3 to the shift range detected by the lever position sensor 12, and to have the display unit 18 display a current shift range state corresponding to a detected result detected by the lever position sensor 12. Although the above explanation of the present embodiment has been made about the ECU 5 operative to have the display unit 18 display the current shift range state corresponding to the detected result detected by the lever position sensor 12, the ECU 5 may be operative to determine the shift ranges other than the P-range in accordance with the acquisition results acquired from a plurality of hydraulic pressure sensors provided in the hydraulic pressure control unit 8 and the operation table for the friction engagement elements preliminarily stored in the ROM, and to determine the P-range in accordance with the P-lock determination position to have the display unit 18 display the determined shift range as a current shift range state. The P-lock determination position will become apparent as the description proceeds. In this way, the current shift range state may be displayed by the display unit 18 in accordance with the actual state of the vehicle 1.

The ECU 5 is adapted to control an actuator 15 for actuating a shift control mechanism 17 to switch the shift range of the automatic transmission 3 between the P-range and the non-P-range. In this way, the ECU 5 is adapted to control the rotation of the actuator 15, and therefore constitutes a rotation control unit as defined in the present invention.

The ECU 5 is adapted to control the actuator 15 and to switch the shift range of the shift control mechanism 17 to the P-range when the P-range is selected by the shift lever 11 in the non-P-range state of the shift range.

On the other hand, the ECU 5 is adapted to control the actuator 15 and to switch the shift range of the shift control mechanism 17 to the non-P-range when the non-P-range is selected by the shift lever 11 in the P-range state of the shift range.

Further, the ECU 5 is adapted to control the hydraulic pressure control unit 8 including the manual valves to form the shift ranges corresponding to the selected shift positions when one of the shift ranges other than the P-range is selected by the shift lever 11. More specifically, the ECU 5 is adapted to control the drive mechanism for driving the manual valves, thereby axially driving the manual valves to secure the hydraulic paths corresponding to the shift ranges.

The actuator 15 is constituted by a switched reluctance motor (hereinafter simply referred to as an "SR motor") and a speed reduction mechanism having a cycloid gear, and is operative to be controlled by the ECU 5 to drive the shift control mechanism 17. This means that the shift control mechanism 17 is electrically controlled in response to the operation of the shift lever 11 by the driver.

An encoder 16 is adapted to detect the rotation amount of the SR motor and to count the number corresponding to the rotation amount of the SR motor. The encoder 16 according to the present embodiment is constituted by a rotary encoder for outputting signals indicative of an A-phase, a B-phase, and a Z-phase. The encoder 16 is adapted to count the number corresponding to the rotation of the actuator 15, and therefore constitutes a counter unit as defined in the present invention.

The ECU 5 is adapted to control the energization for driving the SR motor in accordance with the signals indicative of the count values counted by the encoder 16.

The display unit 18 is adapted to be operated by the instructions of the ECU 5 to display indications and the alarms to the driver, and the states of the equipment, the shift range states, and other information of the vehicle 1.

Figure 3:
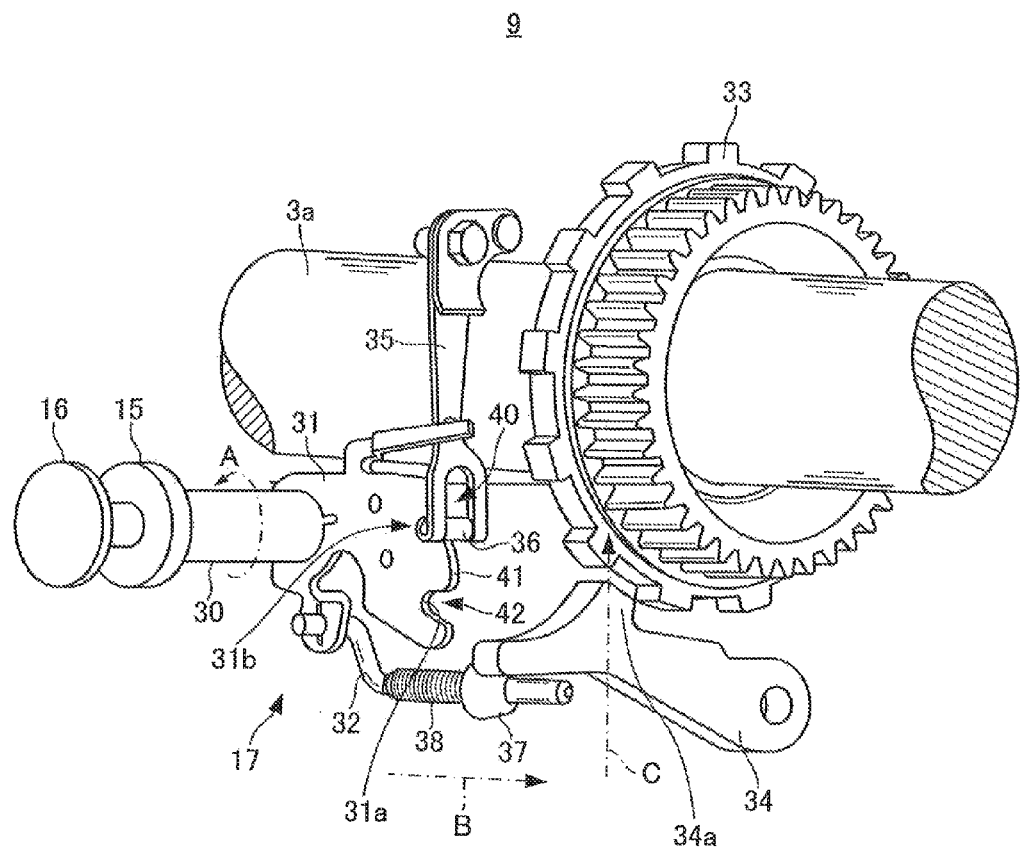
FIG. 3 is a perspective view of a shift control device shown in FIG 1.

FIG. 3 shows a construction of the shift control device 9 which is constituted to include the encoder 16, the actuator 15, and the shift control mechanism 17 functioning as a parking mechanism.

The shift control mechanism 17 comprises a shaft 30 to be rotated by the actuator 15, a detent lever 31 to be rotated by the shaft 30 in response to the rotation of shaft 30, a parking rod 32 to be displaced in response to the rotation of the detent lever 31, a parking gear 33 integrally rotatably secured to the output shaft 3a of the automatic transmission 3, a parking lock pawl 34 for locking the parking gear 33, and a detent spring 35 for restricting the rotation of the detent lever 31 to fix the shift range.

The shift control mechanism 17 thus constructed is operative to selectively take a lock state in which the output shaft 3a of the automatic transmission 3 is not rotatable, or an unlock state in which the output shaft 3a of the automatic transmission 3 is rotatable, as appropriate. Here, the output shaft 3a of the automatic transmission 3 is constituted for example by a counter drive shaft but may be constituted by other drive transmission shaft.

The parking lock pawl 34 is disposed in the vicinity of the parking gear 33 to be rockable around a fulcrum at one end portion of the parking lock pawl 34. The parking lock pawl 34 has a longitudinally intermediate portion formed with a pawl 34a selectively engageable with the parking gear 33 in the manner that the pawl 34a is sandwiched between the neighboring teeth of the parking gear 33, or disengageable from the parking gear 33.

The parking rod 32 is disposed to be displaced by the rotational action of the detent lever 31 substantially in parallel with the center axis of the output shaft 3a, viz., in the forward or rearward direction of the output shaft 3a.

The parking rod 32 has a forward end portion connected with the detent lever 31, and a rear end portion on which is mounted a tapered cone 37 to have the parking lock pawl 34 move toward and away from the parking gear 33.

The tapered cone 37 is regulated from being moved toward the parking gear 33, and urged toward the parking gear 33 by a coil spring 38. The coil spring 38 is mounted on the parking rod 32, and has one end fastened by a snap ring secured to the parking rod 32.

The detent lever 31 is, for example, splined to the shaft 30, and axially movable with respect to the shaft 30 and rotatable together with the shaft 30. The detent lever 31 has a free end portion formed with two grooves 31a, 31b. This means that the detent lever 31 is formed by the two grooves 31a, 31b with two valleys and a mountain 41 between the valleys.

The detent lever 31 is securely connected to the parking rod 32 as previously mentioned. The connection of the detent lever 31 with the parking rod 32 is completed for example by forming a through bore in the predetermined position of the detent lever 31, inserting the bent end portion of the parking rod 32 into the through bore, and fastening the bent end portion of the parking rod 32 to the detent lever 31 by a fastening means such as snap rings, locking pins and the like.

The detent spring 35 is constituted by a plate spring and the like, and has one end portion secured to a case and the like forming part of the automatic transmission 3 to retain the attitude of the detent lever 31. The detent spring 35 has the other end portion on which is provided a roller 36 held in engagement with the grooves 31a, 31b formed in the detent lever 31. The detent spring 35 is adapted to selectively take a parking releasing state in which the roller 36 is held in engagement with the groove 31b, or a parking locking state in which the roller 36 is held in engagement with the groove 31a.

The shaft 30 is rotatably supported on the ease and the like of the automatic transmission 3, and driven by the actuator 15 to rotate in a positive or negative direction by a predetermined angle. The actuator 15 is electrically controlled by the ECU 5 in response to the operation of the shift lever 11 by the driver.

Next, the operation of the shift control mechanism 17 will be explained hereinafter.

FIG. 3 shows a non-P-range state in which the roller 36 of the detent spring 35 is held in engagement with the groove 31b. In this state, the parking lock pawl 34 is unlocked from and thus released from the parking gear 33, so that the output shaft 3a of the automatic transmission 3 is freely rotatable.

From the non-P-range state, the shaft 30 is rotated by the actuator 15 in a direction shown by an arrow A, whereupon the parking rod 32 is urged in a direction shown by an arrow B by the rotation of the shaft 30 through the detent lever 31, so that the parking lock pawl 34 is pushed up in a direction shown by an arrow C by the action of the tapered cone 37 on the parking rod 32.

At this time, the roller 36 of the detent spring 35 positioned at one of the two valleys formed in an outer peripheral portion of the detent lever 31, viz., at a non-P-range position 40 is transferred to the other valley, i.e., a P-range position 42 after moving beyond the mountain 41.

The parking lock pawl 34 is pushed up in response to the rotation of the detent lever 31 until the roller 36 is transferred to the P-range position 42 where the parking gear 33 is locked by the parking lock pawl 34. This means that the output shaft 3a of the automatic transmission 3 is regulated from being rotated.

Here, the ECU 5 is operative to control the rotation amount of the actuator 15 in order to reduce the load on the shift control mechanism 17 including the shaft 30, the detent lever 31, the parking rod 32 and the detent spring 35 at the time of the switching operation of the shift range, viz., to lessen the shock generated When the roller 36 of the detent spring 35 falls into one valley after moving beyond the mountain 41.

Similarly, the ECU 5 is operative to control the rotation amount of the actuator 15 in order to reduce the load on the shift control mechanism 17 at the time of the switching operation of the shift range from the P-range position to the non-P-range position, viz, to lessen the shock generated when the roller 36 of the detent spring 35 falls into the other valley after moving beyond the mountain 41.

Figure 4:
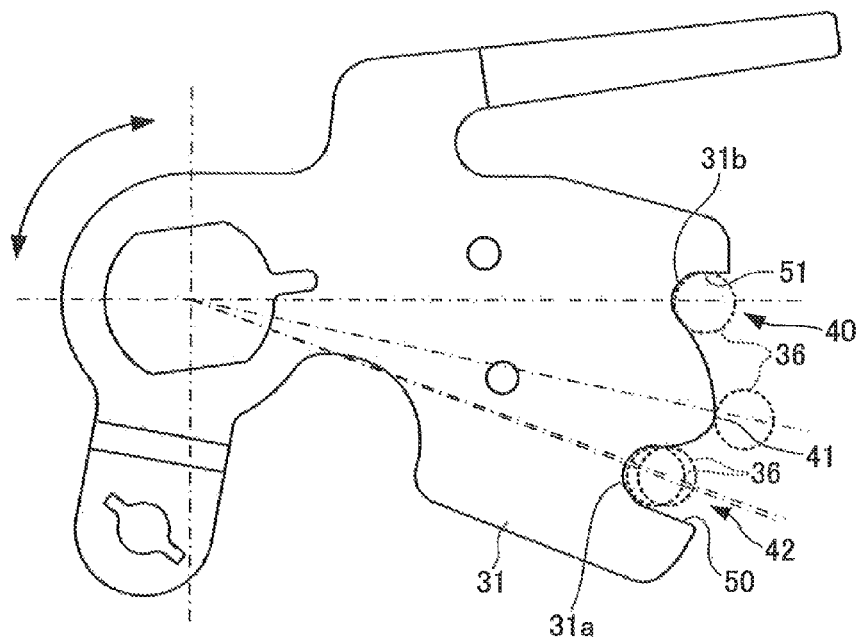
FIG. 4 is an external view of a detent lever shown in FIG. 2.

FIG. 4 shows an external view of the detent lever 31. The detent lever 31 has the outer peripheral portion formed with walls opposing and spaced from the mountain 41 across the valleys. This means that the walls formed on the outer peripheral portion of the detent lever 31 are positioned to he engaged with the roller 36 of the detent spring 35 after the roller 36 is moved beyond the mountain 41.

Hereinafter, the wall positioned at the P-range position 42 is simply referred to as a "P-wall", while the wall positioned at the non-P-range position 40 is simply referred to as a "non-P-wall". The ECU 5 is adapted to control the actuator 15 to prevent the P-wall 50 from colliding with the roller 36 When the roller 36 is moved from the non-P-range position 40 to the P-range position 42.

More specifically, the ECU 5 is operative to stop the rotation of the actuator 15 at a position immediately before the P-wall 50 collides with the roller 36. This position is hereinafter simply referred to as a "P-target rotation position".

On the other hand, the ECU 5 is adapted to control the actuator 15 to prevent the non-P-wall 51 from colliding with the roller 36 when the roller 36 is moved from the P-range position 42 to the non-P-range position 40.

More specifically, the ECU 5 is operative to stop the rotation of the actuator 15 at a position immediately before the non-P-wall Si collides with the roller 36. This position is hereinafter simply referred to as a "non-P-target rotation position".

In this way, the ECU 5 is adapted to control the actuator 15 to prevent the roller 36 of the detent spring 35 from colliding with the P-wall 50 and non-P-wall 51 when the roller 36 falls into the valleys after moving beyond the mountain 41, thereby reducing the load on the shift control mechanism 17.

Figure 5:
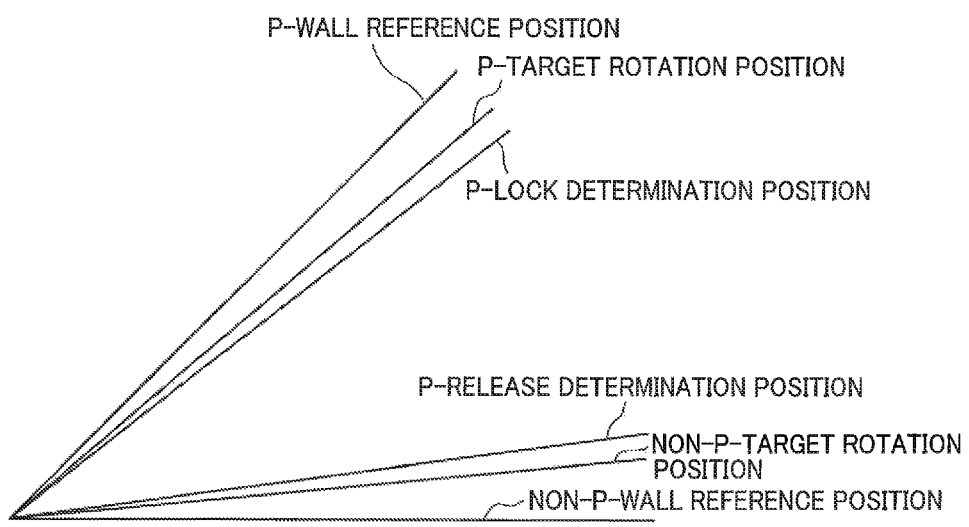
FIG. 5 is a conceptual diagram for explaining a method of controlling an actuator by an ECU shown in FIG. 1.

FIG. 5 is a view for explaining the control of the actuator 15 by the ECU 5. The detent lever 31 is rotated in response to the rotation of the actuator 15 Which is regulated by the P-wall 50 or the non-P-wall 51. The detent lever 31 and the detent spring 35 work in collaboration with each other to have the rotation of the actuator 15 regulated in the predetermined directions at the predetermined shift range. This means that the detent lever 31 and the detent spring 35 constitute in combination a regulation unit as defined in the present invention. More specifically, the P-wall 50 or the non-P-wall 51 constitutes part of the regulation unit as defined in the present invention.

FIG. 5 conceptually shows a position (hereinafter simply referred to as a "P-wall reference position") where the roller 36 is engaged with the P-wall 50, and a position (hereinafter simply referred to as a "non-P-wall reference position") where the roller 36 is engaged with the non-P-wall 51.

The ECU 5 is adapted to detect a current shift range when the rotation position of the actuator 15 detected by the encoder 16 is in the range of the predetermined rotation amount from the P-wail reference position or the non-P-wall reference position.

This means that the ECU 5 is adapted to set a P-lock determination position and a P-release determination position as shift range determination standards. Here, the range from the P-wall reference position to the P-lock determination position and the range from the non-P-wall reference position to the P-release determination position are referred to as shift range determination ranges.

More specifically, the ECU 5 is operative to determine that the current shift range is in the P-range state when the rotation position of the actuator 15 detected by the encoder 16 is in the range from the P-wall reference position to the P-lock determination position, and to determine that the current shift range is in the non-P-range state when the rotation position of the actuator 15 detected by the encoder 16 is in the range from the non-P-wall reference position to the P-release determination position.

Further, the ECU 5 is operative to determine that the current shift range is not determined or in the process of the shift range being switched When the rotation position of the actuator 15 is in the range from the P-lock determination position to the P-release determination position.

Here, the ECU 5 is adapted to store the shift range in the EEPROM at the previous off-time of the vehicle electric source switch 13. The ECU 5 is adapted to set the current shift range with the shift range stored in the EEPROM at the on-time of the vehicle electric source switch 13. This means that the ECU 5 is adapted to detect the wall position for the current shift range in the reference position detection control operation. The ECU 5 is adapted to set the current shift range in accordance with the travel speed of the vehicle 1 when the previous shift range is not stored in the EEPROM. More specifically, the ECU 5 is adapted to determine that the current shift range is the P-range when the vehicle speed is at a low speed slower than or equal to 3 km/h, while to determine that the current shift range is the non-P-range when the vehicle speed is at a medium and high speed faster than 3 km/h. The case that the vehicle speed is at the medium and high speed in the state of the previous shift range being not stored in the EEPROM corresponds to, for example, a situation that the electric source is instantaneously cut off while the vehicle 1 is travelling. The ECU 5 is adapted to determine that the above electric source cut-off state is corresponding to the state in which the data of the current shift range is vanished. In most cases, the ECU 5 is adapted to determine that the vehicle speed is at a low speed at the on-time of the vehicle electric source switch 13, and thus to determine that the current shift range is defined as the P-range.

The ECU 5 is adapted to set the P-target rotation position between the P-wall reference position and the P-lock determination position. The P-target rotation position is defined with a margin from the P-wall reference position to prevent the P-wall 50 from colliding with the roller 36 of the detent spring 35 when the shift range is shifted from the non-P-range to the P-range.

The margin is preliminarily set in consideration of backlashes between the actuator 15 and the detent lever 31. The margin makes it possible to avoid the collision of the P-wall 50 with the roller 36 when the shift range is shifted as previously mentioned.

In a similar manner, the ECU 5 is adapted to set the non-P-target rotation position between the non-P-wall reference position and the P-release determination position. The non-P-target rotation position is defined with a margin from the non-P-wall reference position to prevent the non-P-wall 50 from colliding with the roller 36 of the detent spring 35 when the shift range is shifted from the P-range to the non-P-range.

The margin is preliminarily set in consideration of backlashes between the actuator 15 and the detent lever 31. The margin makes it possible to avoid the collision of the non-P-wall 50 with the roller 36 when the shift range is shifted as previously mentioned. The margin from the P-wall reference position and the margin from the non-P-wall reference position are not necessarily equal to each other, and thus may be defined in accordance with the shape of the detent lever 31 and other designable requests.

In this way, the P-wall reference position and the non-P-wall reference position respectively serve as reference positions to define the shift range determination ranges and the target rotation positions in the P-range position 42 and the non-P-range position 40. It is therefore required that the P-wall reference position and the non-P-wall reference position be accurately detected by the ECU 5.

Next, explanation will hereinafter be made about the characteristic construction of the ECU 5 forming part of the shift range switching apparatus according to the embodiment of the present invention.

The ECU 5 is adapted to detect the reference position of the actuator 15 to be rotated under the regulation of the detent lever 31 and the detent spring 35. For example, the ECU 5 is adapted to detect the P-wall reference position of the actuator 15 which is to be regulated from being rotated by the detent lever 31 and the detent spring 35. Similarly, the ECU 5 is adapted to detect the non-P-wall reference position of the actuator 15 which is to be regulated from being rotated by the detent lever 31 and the detent spring 35.

More specifically, the actuator 15 is deenergized after the actuator 15 is rotated toward the P-wall 50 in the state that the automatic transmission 3 is switched to the P-range as a predetermined shift range. The ECU 5 is adapted to detect the P-wall reference position in accordance with the fluctuation of the count value counted by the encoder 16 when the actuator 15 is deenergized. On the other hand, the actuator 15 is deenergized after the actuator 15 is rotated toward the non-P-wall 51 in the state that the automatic transmission 3 is switched to the non-P-range as a predetermined shift range. The ECU 5 is adapted to detect the non-P-wall reference position in accordance with the fluctuation of the count value counted by the encoder 16 when the actuator 15 is deenergized.

Here, the ECU 5 is operative to deenergize the actuator 15 every time the actuator 15 is rotated toward the P-wall 50 by a unit count value as a count value of the encoder 16 in the state that the automatic transmission 3 is switched to the P-range as the predetermined shift range. The ECU 5 is adapted to detect the P-wall reference position in accordance with the count value of the encoder 16 before the actuator 15 is rotated toward the P-wall 50 in a case that the fluctuation direction of the count value of the encoder 16 when the actuator 15 is rotated toward the P-wall 50 is opposite to the fluctuation direction of the count value of the encoder 16 when the actuator 15 is deenergized.

On the other hand, the ECU 5 is operative to deenergize the actuator 15 every time the actuator 15 is rotated toward the non-P-wall 51 by a unit count value as a count value of the encoder 16 in the state that the automatic transmission 3 is switched to the non-P-range as the predetermined shift range. The ECU 5 is adapted to detect the non-P-wall reference position in accordance with the count value of the encoder 16 before the actuator 15 is rotated toward the non-P-wall 51 in a case that the fluctuation direction of the count value of the encoder 16 when the actuator 15 is rotated toward the non-P-wall 51 is opposite to the fluctuation direction of the count value of the encoder 16 when the actuator 15 is deenergized.

in this way, the ECU 5 is adapted to detect the reference position of the actuator 15, so that the ECU 5 constitutes a reference position detection unit as defined in the present invention. Further, the fluctuation of the count value counted by the encoder 16 when the actuator 15 in the present embodiment is deenergized is intended to mean that the fluctuation direction of the count value is changed.

Here, the preferred embodiment according to the present invention is constructed to have the ECU 5 detect the P-wall reference position when the current shift range takes the P-range, and to have the ECU 5 detect the non-P-wall reference position when the current shift range takes the non-P-range.

FIG. 6 is a flow chart for explaining a P-wall reference position detection operation to detect the P-wall reference position by the shift range switching apparatus 10. The P-wall reference position detection operation to be explained hereinafter is executed at the times When the ECU 5 is started, when the ECU 5 is instantaneously cut off, and when the abnormality is detected.

The ECU 5 is firstly operated to determine whether or not the ECU 5 is in the P-wall reference position detection mode (Step S1). Here, the ECU 5 is operated to determine that the ECU 5 is in the P-wall reference position detection mode when the shift range stored in the EEPROM is the P-range, and to determine that the ECU 5 is not in the P-wall reference position detection mode when the shift range stored in the EEPROM is the non-P-range.

Further, the ECU 5 is operated to determine that the ECU 5 is in the P-wall reference position detection mode when the shift range is not stored in the EEPROM and when the shift range set in accordance with the travel speed of the vehicle 1 is the P-range, The ECU 5 is operated to determine that the ECU 5 is not in the P-wall reference position detection mode when the shift range set in accordance with the travel. speed of the vehicle 1 is the non-P-range.

When the ECU 5 determines that the ECU 5 is not in the P-wall reference position detection mode, the ECU 5 terminates the P-wall reference position detection operation. In this case, the ECU 5 is operated to execute the P-wall reference position detection operation when the shift range is switched from the non-P-range to the P-range. Here, the ECU 5 is operated to determine whether or not the shift range is switched from the non-P-range to the P-range in accordance with the results detected by the lever position sensor 12.

When, on the other hand, the ECU 5 determines that the ECU 5 is in the P-wall reference position detection mode, the ECU 5 is operated to rotate the actuator 15 by one count value (Step S2) in a positive direction (in a direction shown by the arrow A in FIG. 3).

The ECU 5 is then operated to allow the actuator 15 to be deenergized (Step S3). Here, the ECU 5 is operated to determine whether or not the count value counted by the encoder 16 is reduced (Step S4). When the ECU 5 determines that the count value counted by the encoder 16 is not reduced, the ECU 5 is operated to again execute the P-wall reference position detection operation in Step S2.

When, on the other hand, the ECU 5 determines that the count value counted by the encoder 16 is reduced, the ECU 5 is operated to detect the position of the actuator 15 before the actuator 15 is rotated in Step S2 as the P-wall reference position (Step S5). Although the above embodiment is constructed to have the ECU 5 operated to detect the position of the actuator 15 before the actuator 15 is rotated in Step S2 as the P-wall reference position, the present invention may be constructed as follows. The ECU 5 may be operated to detect as the P-wall reference position the count value subtracted from the position of the actuator 15 before the actuator 15 is rotated in Step S2 the count value α of the encoder 16 corresponding to the rotation amount of the actuator 15 to the time when the detent lever 31 starts to be urged back by the detent spring 35 when the actuator 15 is further rotated after the roller 36 is actually engaged with the P-wall 50. The above count value α is experimentally defined in advance.

The ECU 5 is operated to detect the P-wall reference position in the manner previously mentioned, and then to calculate the P-target rotation position by subtracting the previously described margin from the P-wall reference position (Step S6) to terminate the P-wall reference position detection operation.

FIG. 7 is a flow chart for explaining a non-P-wall reference position detection operation to detect the non-P-wall reference position by the shift range switching apparatus 10. The non-P-wall reference position detection operation to be explained hereinafter is executed at the times when the ECU 5 is started, When the ECU 5 is instantaneously cut off, and when the abnormality is detected.

The ECU 5 is firstly operated to determine whether or not the ECU 5 is in the non-P-wall reference position detection mode (S11). Here, the ECU 5 is operated to determine that the ECU 5 is in the non-P-wall reference position detection mode when the shift range stored in the EEPROM is the non-P-range, and to determine that the ECU 5 is not in the non-P-wall reference position detection mode when the shift range stored in the EEPROM is the P-range.

Further, the ECU 5 is operated to determine that the ECU 5 is in the P-wall reference position detection mode when the shift range is not stored in the EEPROM and when the shift range set in accordance with the travel speed of the vehicle 1 is the P-range. The ECU 5 is operated to determine that the ECU 5 is not in the P-wall reference position detection mode when the shift range set in accordance with the travel speed of the vehicle 1 is the non-P-range.

When the ECU 5 determines that the ECU 5 is not in the non-P-wall reference position detection mode, the ECU 5 terminates the non-P-wall reference position detection operation. In this case, the ECU 5 is operated to execute the non-P-wall reference position detection operation when the shift range is switched from the P-range to the non-P-range. Here, the ECU 5 is operated to determine whether or not the shift range is switched from the P-range to the non-P-range in accordance with the results detected by the lever position sensor 12.

When, on the other hand, the ECU 5 determines that the ECU 5 is in the non-P-wall reference position detection mode, the ECU 5 is operated to rotate the actuator 15 by one count value (Step S12) in a negative direction (in a direction opposite to the direction shown by the arrow A in FIG. 3).

The ECU 5 is then operated to allow the actuator 15 to be deenergized (Step S13). Here, the ECU 5 is operated to determine whether or not the count value counted by the encoder 16 is increased (Step S14). When the ECU 5 determines that the count value counted by the encoder 16 is not increased, the ECU 5 is operated to again execute the non-P-wall reference position detection operation in Step S12.

When, on the other hand, the ECU 5 determines that the count value counted by the encoder 16 is increased, the ECU 5 is operated to detect the position of the actuator 15 before the actuator 15 is rotated in Step S12 as the non-P-wall reference position (Step S15). Although the above embodiment is constructed to have the ECU 5 operated to detect the position of the actuator 15 before the actuator 15 is rotated in Step S12 as the non-P-wall reference position, the present invention may be constructed as follows. The ECU 5 may be operated to detect as the non-P-wall reference position the count value added to the position of the actuator 15 before the actuator 15 is rotated in Step S12 the count value β of the encoder 16 corresponding to the rotation amount of the actuator 15 to the time when the detent lever 31 starts to be urged back by the detent spring 35 when the actuator 15 is further rotated after the roller 36 is actually engaged with the non-P-wall 51. The above count value β is experimentally defined in advance.

The ECU 5 is operated to detect the non-P-wall reference position in the manner previously mentioned, and then to calculate the non-P-target rotation position by adding the previously described margin to the non-P-wall reference position (Step S16) to terminate the non-P-wall reference position detection operation.

As will be understood from the foregoing description, the shift range switching apparatus 10 according to the present embodiment can detect the positions of the P-wall 50 and non-P-wall 51 while energizing the actuator 15 to be rotated by one count value in a direction toward the P-wall 50 or non-P-wall 51 and deenergizing the actuator 15 to remove the backlashes of the shift control mechanism 17. For this reason, the shift range switching apparatus 10 according to the present embodiment is not required as in the conventional shift range switching apparatus to rotate the actuator 15 until the rotation force of the actuator 15, the restoring force of the detect spring 35, and the restoring force of the parking rod 32 are balanced for the purpose of detecting the P-wall reference position and the non-P-wall reference position, thereby making it possible to improve the durability of the shift control mechanism 17 over the conventional shift range switching apparatus.

Further, the shift range switching apparatus 10 according to the present embodiment is constructed to set the detected P-wall 50 as a reference position, thereby making it possible to adequately control the rotation of the actuator 15 even with the encoder 16 which can detect only the relative position information. It will therefore be appreciated that the shift range switching operation can adequately be carried out even with no neutral switch and the like.

The previously mentioned shift range switching apparatus 10 according to the first embodiment has been explained with the example in which the shift range switching apparatus 10 is adapted to have the electric source deenergized every time the actuator 15 is rotated by one count value. The present invention, however, may be modified to detect the reference position of the actuator 15 with respect to each of the walls by deenergizing the actuator 15 every time the actuator 15 is rotated by an arbitrary count value as in the shift range switching apparatus according the second embodiment which will be described hereinafter.

(Second Embodiment)

The shift range switching apparatus according the present embodiment can be realized by modifying the program stored in the ROM of the ECU 5 forming part of the shift range switching apparatus 10 according the first embodiment of the present invention.

Therefore, the hardware configuration of the shift range switching apparatus according the present embodiment is the same as the hardware configuration of the shift range switching apparatus 10 according the first embodiment. For this reason, the shift range switching apparatus according the present embodiment will be explained hereinafter with reference to FIGS. 1 to 5 inclusive.

The rotation direction of the actuator 15 and the fluctuation of the count value by the encoder 16 for the non-P-wall reference position detection operation are respectively opposite to the rotation direction of the actuator 15 and the fluctuation of the count value by the encoder 16 for the P-wall reference position detection operation as has been explained in the first embodiment of the present invention, so that the non-P-wall reference position detection operation can easily be estimated in accordance with the P-wall reference position detection operation. Therefore, the P-wall reference position detection operation of the present embodiment will be explained in detail hereinafter, while the non-P-wall reference position detection operation of the present embodiment will be explained in simplicity hereinafter.

The ECU 5 is adapted to detect the reference position of the actuator 15 to be rotated under the regulation of the detent lever 31 and the detent spring 35. For example, the ECU 5 is adapted to detect the P-wall reference position of the actuator 15 which is to be regulated from being rotated by the detent lever 31 and the detent spring 35. Similarly, the ECU 5 is adapted to detect the non-P-wall reference position of the actuator 15 which is to be regulated from being rotated by the detent lever 31 and the detent spring 35. Here, the ECU 5 is adapted to detect the P-wall reference position when the current shift range is the P-range, and to detect the non-P-wall reference position when the current shift range is the non-P-range.

More specifically, the actuator 15 is deenergized after the actuator 15 is rotated toward the P-wall 50 in the state that the automatic transmission 3 is switched to the P-range as a predetermined shift range. The ECU 5 is adapted to detect the P-wall reference position in accordance with the fluctuation of the count value counted by the encoder 16 when the actuator 15 is deenergized. On the other hand, the actuator 15 is deenergized after the actuator 15 is rotated toward the non-P-wall 51 in the state that the automatic transmission 3 is switched to the non-P-range as a predetermined shift range. The ECU 5 is adapted to detect the non-P-wall reference position in accordance with the fluctuation of the count value counted by the encoder 16 when the actuator 15 is deenergized.

In this way, the ECU 5 is adapted to detect the reference position of the actuator 15, so that the ECU 5 constitutes a reference position detection unit as defined in the present invention. Further, the fluctuation of the count value counted by the encoder 16 when the actuator 15 in the present embodiment is deenergized is intended to mean a fluctuation amount when the fluctuation direction of the count value is changed.

The detection of the reference position by the ECU 5 will be described in detail hereinafter. The ECU 5 has an EEPROM which preliminarily stores therein a map used for detecting the P-wall reference position as shown in FIG. 8. The map is representative of the relationship between a count value X (first count value) and a count value Y (second count value). The count value X is corresponding to the return amount of the actuator 15 caused when the actuator 15 is deenergized after the actuator 15 is rotated in the positive direction from the current position of the actuator 15 by a predetermined count value Z. The count value Y is corresponding to the distance from the P-wall reference position to the current position of the actuator 15. Similarly, the EEPROM of the ECU 5 is adapted to preliminarily store therein a map used for detecting the non-P-wall reference position. According to the present invention, the ECU 5 may have not only the map corresponding to the predetermined count value Z, but also a map corresponding to a count value Zx different from the predetermined count value Z.

More specifically, the actuator 15 is deenergized after the actuator 15 is rotated toward the P-wall 50 by the predetermined count value in the state that the automatic transmission 3 is switched to the P-range as the predetermined shift range. The ECU 5 is adapted to detect the P-wall reference position in accordance with the current position of the actuator 15 and the second count value related on the map with the first count value corresponding to the return amount of the actuator 15 caused when the actuator 15 is deenergized.

Similarly, the actuator 15 is deenergized after the actuator 15 is rotated toward the non-P-wall 51 by the predetermined count value in the state that the automatic transmission 3 is switched to the non-P-range as the predetermined shift range, The ECU 5 is adapted to detect the non-P-wall reference position in accordance with the current position of the actuator 15 and the second count value related on the map with the first count value corresponding to the return amount of the actuator 15 caused when the actuator 15 is deenergized.

In this way, the ECU 5 is adapted to detect the reference position of the actuator 15 in accordance with the map preliminarily stored in the EEPROM. Here, the map preliminarily stored may be corrected as will be explained hereinafter according to the present invention.

Here, the ECU 5 is preferably operated to detect the reference position by a method explained in the first embodiment and to comet the map in the state set with the reference position. More specifically, as has been explained in the first embodiment, the ECU 5 is firstly operated to deenergize the actuator 15 every time the actuator 15 is rotated toward the P-wall 50 by one count value as a count value of the encoder 16 in the state that the automatic transmission 3 is switched to the P-range as the predetermined shift range. The ECU 5 is adapted to detect the P-wall reference position in accordance with the count value of the encoder 16 before the actuator 15 is rotated toward the P-wall 50 in the case that the fluctuation direction of the count value of the encoder 16 when the actuator 15 is rotated toward the P-wall 50 is opposite to the fluctuation direction of the count value of the encoder 16 when the actuator 15 is deenergized. The ECU 5 is similarly adapted to detect the non-P-wall reference position.

In this way, the ECU 5 is operative to rotate the actuator 15 from an arbitrary position in a predetermined direction by a predetermined count value when the reference position is detected. The ECU 5 is then deenergized to correct the map in accordance with the first count value corresponding to the return amount of the actuator 15 caused when the actuator 15 is deenergized, and the second count value corresponding to the distance from the reference position to the arbitrary position.

Here, as previously mentioned, the ECU 5 is operative to rotate the actuator 15 from the arbitrary position in the predetermined direction by the predetermined count value, and to deenergize the actuator 15 to correct the map, however, the actuator 15 may be rotated by an arbitrary count value Zx different front the predetermined count value Z. In this case, the map corresponding to the respective count value is corrected.

Further, ECU 5 is adapted to correct the map while the actuator 15 is waiting. Here, the term "waiting" is intended to mean a time interval during which the actuator 15 is not operated for the purpose of switching the shift range, and not operated for the purpose of detecting the reference position of the actuator 15 with respect to each of the walls. In this way, the ECU 5 constitutes a map storage unit that stores the map, and a map correction unit that corrects the map as defined in the present invention.

FIG. 9 is a flow chart for explaining a P-wall reference position detection operation for detecting the P-wall reference position by the shift range switching apparatus 10. The P-wall reference position detection operation to be explained hereinafter is executed at the times when the ECU 5 is started, when the ECU 5 is instantaneously cut off, and when the abnormality is detected.

The ECU 5 is firstly operated to determine whether or not the ECU 5 is in the P-wall reference position detection mode (Step S21). Here, the ECU 5 is operated to determine that the ECU 5 is in the P-wall reference position detection mode when the shift range stored in the EEPROM is the P-range, and to determine that the ECU 5 is not in the P-wall reference position detection mode when the shift range stored in the EEPROM is the non-P-range.

Further, the ECU 5 is operated to determine that the ECU 5 is in the P-wall reference position detection mode when the shift range is not stored in the EEPROM and when the shift range set in accordance with the travel speed of the vehicle 1 is the P-range, and to determine that the ECU 5 is not in the P-wall reference position detection mode when the shift range set in accordance with the travel speed of the vehicle 1 is the non-P-range.

When the ECU 5 determines that the ECU 5 is not in the P-wall reference position detection mode, the ECU 5 terminates the P-wall reference position detection operation. In this case, the ECU 5 is operated to execute the P-wall reference position detection operation when the shift range is switched from the non-P-range to the P-range. Here, the ECU 5 is operated to determine whether or not the shift range is switched from the non-P-range to the P-range in accordance with the results detected by the lever position sensor 12.

When, on the other hand, the ECU 5 determines that the ECU 5 is in the P-wall reference position detection mode, the ECU 5 is operated to rotate the actuator 15 by a predetermined count value Z (Step S22) in a positive direction (in a direction Shown by the arrow A in FIG, 3).

The ECU 5 is then operated to allow the actuator 15 to be deenergized (Step S23). Here, the ECU 5 is operated to acquire a count value Yn related on the map used for detecting the P-wall reference position with a count value Xn corresponding to the return amount of the actuator 15 counted by the encoder 16 (Step S24).

The ECU 5 is operated to detect as the P-wall reference position the position obtained by adding the acquired count value Yn and the current position (Step S25). When the ECU 5 detects the P-wall reference position, the ECU 5 subtracts the previously mentioned margin from the P-wall reference position to calculate the P-target rotation position (Step S26), and then terminate the P-wall reference position detection operation.

Similarly, in the non-P-wall reference position detection operation, the ECU 5 is operated to rotate the actuator 15 in the opposite direction by the predetermined count value Z, and then to deenergize the actuator 15 when the ECU 5 determines that the ECU 5 is in the non-P-wall reference position detection mode.

The ECU 5 is operated to acquire the count value Yn related on the map used for detecting the non-P-wall reference position with a count value Xn corresponding to the return amount of the actuator 15 counted by the encoder 16, to detect as the non-P-wall reference position the position obtained by subtracting the acquired count value Yn from the current position, to calculate the non-P-target rotation position by adding the previously mentioned margin to the non-P-wall reference position, and to terminate the non-P-wall reference position detection operation.

FIG. 10 is a flow chart for explaining a map correction operation for detecting the P-wall reference position by the shift range switching apparatus 10. The map correction operation for detecting the P-wall reference position to be explained hereinafter is executed under the condition that the shift range is the P-range at the starting time of the ECU 5 and the actuator 15 is waiting.

The ECU 5 is firstly operated to detect the P-wall reference position (Step S31). At this time, the ECU 5 executes the same processing as in the steps S2 to S5 of the P-wall reference position detection operation explained with reference to FIG. 6.

The ECU 5 is then operated to rotate the actuator 15 by an arbitrary count value, thereby changing the current position (Step S32). The ECU 5 is operated to rotate the actuator 15 by a predetermined count value Z in a positive direction (in the direction shown by an arrow A in FIG. 3) (Step S33).

The ECU 5 is then operated to deenergize the actuator 15 (Step S34). At this time, the ECU 5 acquires the count value X corresponding to the return amount of the actuator 15 counted by the encoder 16 (Step S35).

The ECU 5 is then operated to correct the count value Xn related on the map with the count value Yn corresponding to the distance from the P-wall reference position detected in the step S31 to the current position changed in the step S32 with the count value Xc acquired in the step S35 (Step S36), and then to terminate the map correction operation for detecting the P-wall reference position.

Further, the shift range switching apparatus 10 is not necessarily required to execute the map correction operation for detecting the P-wall reference position when the above condition is established, and may execute the map correction operation when the above condition is established with the travel distance exceeding the preliminarily set distance and with the number of the shift range switching operation exceeding the preliminarily set number.

Further, the shift range switching apparatus 10 may execute the following step S33 to S36 several times while changing the current position in the step S32 when the above condition is established.

Further, the ECU 5 may store an updated date and time with respect to the count value Yn corresponding to the distance from the P-wall reference position to the current position, and to preferentially correct the map for detecting the P-wall reference position from the count value Xn corresponding to the count value Yn old in the updated date and time.

The map correction operation for detecting the non-P-wall reference is executed under the condition that the shift range is the non-P range, and the actuator 15 is waiting. In the map correction operation for detecting the non-P-wall reference, the ECU 5 is firstly operated to detect the non-P-wall reference position (the same processing as in the steps S12 to S15 of the non-P wall reference position detection operation explained with reference to FIG. 7), and to change the current position by rotating the actuator 15 by an arbitrary count value to rotate the actuator 15 in the opposite direction by a predetermined count value Z.

The ECU 5 is then operated to deenergize the actuator 15 and to acquire the count value Xc corresponding to the return amount of the actuator 15 counted by the encoder 16. The ECU 5 is then operated to correct the count value Xn related on the map with the count value Yn by the count value Xc corresponding to the return amount of the actuator 15, and then to terminate the map correction operation for detecting the non-P-wall reference.

Further, the shift range switching apparatus 10 is not necessarily required to execute the map correction operation for detecting the P-wall reference position when the above condition is established, and may execute the map correction operation when the above condition is established with the travel distance exceeding the preliminarily set distance and with the number of the shift range switching operation exceeding the preliminarily set number.

Further, the shift range switching apparatus 10 may be operative to execute the following processing several times while changing the current position when the above condition is established. Further, the ECU 5 may store an updated date and time with respect to the count value Yn corresponding to the distance from the non-P-wall reference position to the current position, and to preferentially correct the map for detecting the non-P-wall reference position from the count value Xn corresponding to the count value Yn old in the updated date and time.

As will be understood from the foregoing description, the shift range switching apparatus 10 according to the present embodiment can detect the P-wall reference position or the non-P-wall reference position only by rotating the actuator 15 by only one time in the range of no rotation of the actuator 15 until the rotation force of the actuator 15, the restoring force of the detect spring 35, and the restoring force of the parking rod 32 are balanced, thereby making it possible to promptly detect the P-wall reference position and the non-P-wall reference position.

Further, the shift range switching apparatus 10 according to the present embodiment can appropriately correct the map for detecting the reference position, thereby making it possible to optimize the map in response to the variations in quality and assembled state of the elements or parts forming the shift control mechanism 17 and in response to secular changes of the elements or parts forming the shift control mechanism 17.

Further, the shift range switching apparatus 10 according to the present embodiment is constructed to have a map established for detecting the reference position when detecting the reference position, thereby making it possible to promptly detect the reference position as well as to suppress the establishment of the current shift range from being delayed.

The foregoing explanation has been made about the shift range switching apparatuses according to the first and second embodiments each of which comprises a clutch-to-clutch to be operated to allow the power transmission paths to be switched, thereby realizing the speed change of a vehicle having a stepped automatic transmission mounted thereon. However, the shift range switching apparatus according to the present invention is not limited to this, and can be applied to a vehicle having a continuously variable transmission or the like.

As has already been explained in the above description, the shift range switching apparatus according to the present invention has an advantageous effect capable of improving the durability of the shift control mechanism over the conventional shift range apparatus, and is thus useful for an overall shift range switching apparatus of an automatic transmission employing a shift-by-wire type.

REFERENCE SIGNS LIST

1: vehicle
2: engine
3: automatic transmission
4: drive wheel
5: ECU (rotation control unit, reference position detection unit, map storage unit, map correction unit)
6: torque convertor
7: transmission mechanism unit
8: hydraulic pressure control unit
9: shift control device
10: shift range switching apparatus
11: shift lever
12: lever position sensor
13: vehicle electric source switch
15: actuator
16: encoder (counter unit)
17: shift control mechanism
18: display unit
19: differential gear
30: shaft
31: detent lever (regulation unit)
32: parking rod
33: parking gear
34: parking lock pawl
35: detent spring (regulation unit)
36: roller
37: tapered cone
38: coil spring

The invention claimed is:
1. A shift range switching apparatus of an automatic transmission for shifting shift ranges with an actuator, comprising
 a counter unit that counts the number corresponding to the rotation amount of the actuator,
 a rotation control unit that controls the rotation of the actuator,
 a regulation unit that regulates the actuator from being rotated in a predetermined rotation direction in a predetermined shift range, a reference position detection unit that detects a reference position of the actuator to be regulated by the regulation unit, a map storage unit that stores a map representative of the relationship between a first count value and a second count value, the first count value corresponding to a return amount of the actuator caused when the actuator is moved from a position at which the actuator is deenergized to a position at which the actuator is stopped after the actuator is deenergized and rotated in a direction opposite to the predetermined direction, the actuator being deenergized after the actuator is rotated in the predetermined direction from a current position of the actuator by a predetermined count value, and the second count value corresponding to a distance from the reference position to the current position of the actuator, and wherein the rotation control unit is operative to have the actuator deenergized after the actuator is rotated by the predetermined count value in the predetermined direction from the current position of the actuator in the state that the automatic transmission is shifted to the predetermined shift range, and the reference position detection unit is operative to detect the reference position in accordance with the second count value and the current position, the second count value being related on the map with the first count value corresponding to the return amount of the actuator caused when the actuator is deenergized.

2. A shift range switching apparatus of an automatic transmission for shifting shift ranges with an actuator, comprising a counter unit that counts the number corresponding to the rotation amount of the actuator, a rotation control unit that controls the rotation of the actuator, a regulation unit that regulates the actuator from being rotated in a predetermined rotation direction in a predetermined shift range, and a reference position detection unit that detects a reference position of the actuator to be regulated by the regulation unit, wherein the rotation control unit is operative to have the actuator deenergized every time the actuator is rotated by one count value in the predetermined direction in the state that the automatic transmission is shifted to the predetermined shift range, and the reference position detection unit is operative to detect the reference position in accordance with a prior count value counted by the counter unit before the actuator is rotated in the predetermined direction when fluctuation direction of the count value in which the actuator is rotated in the predetermined direction is opposite to the fluctuation direction of the count value in which the actuator is deenergized.

3. The shift range switching apparatus of the automatic transmission as set forth in claim 1, which further comprises a map correction unit that corrects the map, and in which the rotation control unit is operative to have the actuator deenergized every time the actuator is rotated by one count value in the predetermined direction in the state that the automatic transmission is shifted to the predetermined shift range, the reference position detection unit is operative to detect the reference position in accordance with a prior count value counted by the counter unit before the actuator is rotated in the predetermined direction when the fluctuation direction of the count value in which the actuator is rotated in the predetermined direction is opposite to the fluctuation direction of the count value in which the actuator is deenergized, the rotation control unit is further operative to have the actuator deenergized by rotating the actuator by the predetermined count value in the predetermined direction from an arbitrary position of tile actuator when the reference position is detected, and the map correction unit is operative to correct the map in accordance with the first count value corresponding to the return amount of the actuator caused when the actuator is deenergized and the second count value corresponding to the distance from the reference position to the arbitrary position.

4. The shift range switching apparatus of the automatic transmission as set forth in claim 3, in which the map correction unit is operative to have the map corrected while the actuator is waiting.

* * * * *